US009351054B2

(12) United States Patent
Indre et al.

(10) Patent No.: US 9,351,054 B2
(45) Date of Patent: May 24, 2016

(54) DEVICE AND A METHOD FOR MERGING OPTICAL COMPONENTS ASSOCIATED WITH ONE WAVELENGTH INTO A MERGED OPTICAL COMPONENT

(75) Inventors: Raluca-Maria Indre, Paris (FR); Thomas Bonald, Voisins Le Bretonneux (FR); Davide Cuda, Aosta (IT)

(73) Assignee: FRANCE TELECOM, Paris (FR)

( * ) Notice: Subject to any disclaimer, the term of this patent is extended or adjusted under 35 U.S.C. 154(b) by 475 days.

(21) Appl. No.: 13/552,292

(22) Filed: Jul. 18, 2012

(65) Prior Publication Data

US 2013/0022354 A1 Jan. 24, 2013

(30) Foreign Application Priority Data

Jul. 21, 2011 (FR) ..................................... 11 56624
Mar. 23, 2012 (FR) ..................................... 12 52610

(51) Int. Cl.
*H04J 14/00* (2006.01)
*H04Q 11/00* (2006.01)
*H04J 14/02* (2006.01)

(52) U.S. Cl.
CPC ........ *H04Q 11/0005* (2013.01); *H04J 14/0212* (2013.01); *H04J 14/0217* (2013.01); *H04Q 2011/0013* (2013.01); *H04Q 2011/0015* (2013.01); *H04Q 2011/0016* (2013.01); *H04Q 2011/0024* (2013.01)

(58) Field of Classification Search
CPC .......................... H04J 14/0212; H04J 14/0217
See application file for complete search history.

(56) References Cited

U.S. PATENT DOCUMENTS 6,154,583 A * 11/2000 Kuroyanagi ....... H04Q 11/0003 385/15
6,215,568 B1 * 4/2001 Bischoff ............. H04J 14/0212 398/55
6,487,329 B2 * 11/2002 Foltzer ................ G02B 6/3542 359/326

(Continued)

FOREIGN PATENT DOCUMENTS

EP 1838128 A2 9/2007

OTHER PUBLICATIONS

French Search Report and Written Opinion dated Mar. 8, 2012 for corresponding French Application No. FR 1156624, filed Jul. 21, 2011.

(Continued)

*Primary Examiner* — Ken Vanderpuye
*Assistant Examiner* — Amritbir Sandhu
(74) *Attorney, Agent, or Firm* — David D. Brush; Westman, Champlin & Koehler, P.A.

(57) ABSTRACT

A device and a method are provided for merging a plurality of optical components associated with one wavelength into an optical component associated with the wavelength. The merging device includes, for each optical component of the plurality of components for merging: an optical element arranged to switch to a blocking position for blocking the optical component for merging, as a function of a blocking signal; a duplication element arranged to duplicate the optical component for merging for sending to combination element. The combination element is arranged to obtain the blocking signal by combining the duplicated optical components of the plurality of components other than the optical component for merging. A merging element is arranged to merge the optical components output by the optical element. The merging device may be integrated in an optical combiner of optical signals.

12 Claims, 3 Drawing Sheets

$\lambda_{i,1}$ $\lambda_{i,2}$ $\lambda_{i,3}$ 31 32 33 41 42 43 3 : 1 70 $\lambda_{i,4}$ 61 62 63 C C C O/E 53 O/E 52 O/E 51 20

(56) References Cited

U.S. PATENT DOCUMENTS 7,508,783 B2* 3/2009 Bonald ................. H04W 72/02 370/321
7,522,836 B2* 4/2009 Islam ................. G02B 26/0808 398/48
2002/0048066 A1* 4/2002 Antoniades ......... H04J 14/0209 398/82
2002/0126943 A1* 9/2002 Foltzer ................. G02B 6/3542 385/15
2003/0118272 A1* 6/2003 Tsushima ........... H04J 14/0227 385/16
2003/0133641 A1* 7/2003 Yoo ........................ B82Y 20/00 385/14
2003/0175030 A1* 9/2003 Chen ................... H04J 14/0209 398/85
2003/0185565 A1* 10/2003 Wang .................. H04J 14/0212 398/49
2003/0206684 A1* 11/2003 Nishi .................. H04J 14/0209 385/17
2004/0022248 A1 2/2004 Yuang et al.
2004/0081421 A1* 4/2004 Mori .................... H04B 10/506 385/140
2004/0131309 A1* 7/2004 Zhang ................ G02B 6/29362 385/24
2006/0013586 A1* 1/2006 Pichler ............... H04Q 11/0005 398/50
2006/0133807 A1* 6/2006 Jenkins ............... H04J 14/0204 398/59
2007/0201868 A1* 8/2007 Aoki .................... G02B 6/2813 398/45
2007/0223921 A1* 9/2007 Sone .................. H04Q 11/0005 398/45
2008/0260386 A1* 10/2008 Boduch ............... H04J 14/0204 398/83
2009/0003827 A1* 1/2009 Kai ..................... H04J 14/0227 398/45
2009/0041457 A1* 2/2009 Maki ................... H04J 14/0204 398/45
2010/0007943 A1* 1/2010 Nakagawa ............. H01S 5/026 359/337.2
2010/0014863 A1* 1/2010 Zami ................... H04J 14/0204 398/79
2010/0027996 A1* 2/2010 Chung ................ H04J 14/0219 398/49
2010/0034532 A1* 2/2010 Ghelfi ................. H04J 14/0204 398/2
2010/0135659 A1* 6/2010 Kim ...................... H04L 49/352 398/51
2011/0164876 A1* 7/2011 Fujita .................. H04J 14/0204 398/48
2012/0128347 A1* 5/2012 Sakamoto ........... H04J 14/0204 398/9
2012/0155862 A1* 6/2012 Sato ................... H04B 10/0793 398/27
2012/0275794 A1* 11/2012 Melamed ............ H04J 14/0204 398/83
2013/0315580 A1* 11/2013 Boertjes .............. H04J 14/0204 398/5
2014/0255026 A1* 9/2014 Roorda ............... H04J 14/0212 398/49
2014/0348464 A1* 11/2014 Kamura ............. H04B 10/0775 385/16
2015/0180603 A1* 6/2015 Darling ............... H04J 14/0212 398/49
2015/0188276 A1* 7/2015 Mitchell ............. H04J 14/0201 359/337.21
2015/0215687 A1* 7/2015 Aono .................. H04B 10/079 398/48
2015/0256908 A1* 9/2015 Zhu ......................... H04L 45/62 398/85

OTHER PUBLICATIONS

English translation of the French Written Opinion for corresponding French Patent Application No. 1156624, filed Jul. 21, 2011.

Chunming Qiao et al: "Optical Burst Switching (OBS)—A New Paradigm for an Optical Internet", Lab for Advanced Network Design, Evaluation and Research (LANDER), University at Buffalo, Buffalo, New York, 1999, pp. 1-24.

Mike J. O'Mahony et al.: "The Application of Optical Packet Switching in Future Communication Networks", IEEE Communications Magazine—Optical Packet Switching Networks, Ilotron Engineering Centre, Mar. 2001, pp. 128-135.

* cited by examiner

DEVICE AND A METHOD FOR MERGING OPTICAL COMPONENTS ASSOCIATED WITH ONE WAVELENGTH INTO A MERGED OPTICAL COMPONENT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of optical transmission networks and it relates to devices for merging a plurality of optical components associated with one wavelength into an optical component associated with the same wavelength in said networks.

The intended field of application is that of optical equipment for switching, in particular for optical access networks and for data centers.

Two types of switching equipment exist in optical networks:

- electronic switches or routers that enable packets to be caused to wait in the event of congestion; and
- optical switches that do not process traffic at packet level but that enable permanent optical circuits to be established between two electronic switches or routers.

BACKGROUND OF THE DISCLOSURE

In order to avoid processing each packet electronically, which is expensive in energy terms, and in order to increase switching speeds, the document entitled "Optical burst switching (OBS)—a new paradigm for an optical Internet" by C. Qiao et al, published in "Journal of High Speed Networks", 8:69-84, 1999, proposes aggregating packets in bursts and in switching the bursts optically. Nevertheless, a signaling packet needs to be sent beforehand in order to configure the optical switches before the arrival of the bursts. The performance of that method in terms of resource utilization is not optimal, since the period between the signaling packet and the burst cannot in general be used for switching other bursts.

The document "The application of optical packet switching in future communication networks" by M. O'Mahony et al., published in "IEEE Communications Magazine" March 2001, proposes an optical switching method in which the packets are aggregated into an optical packet as a function of their destination and as a function of quality of service constraints. An optical packet has a label specifying in particular its destination. An optical switch puts the optical packets into a queue in order to read the label and configure the switching table, and it then switches the optical packet. The label is processed electronically. For the time being, that method is not mature since the performance of available optical memories is very limited.

SUMMARY

In a first aspect, an embodiment of the disclosure provides a merging device for merging a plurality of optical components associated with one wavelength into an optical component associated with said wavelength, the device comprising, for each optical component of said plurality of components for merging:

- an optical element arranged to switch to a blocking position for blocking said optical component for merging, as a function of a blocking signal;
- a duplication element arranged to duplicate said optical component for merging for sending to combination element;
- a combination element, arranged to obtain said blocking signal by combining the duplicated optical components of the plurality of components other than said optical component for merging; and
- a merging element arranged to merge the optical components output by the optical element.

An exemplary embodiment of the disclosure is based on a review of existing all-optical switching methods. In that context, a search has been made for an alternative, and a need has been identified for a device capable of merging optical components that are associated with one wavelength into an optical component that is associated with the same wavelength, said device being capable of managing collisions. The term "optical component" is used herein to designate an optical signal carried by a given wavelength.

The merging device of the first aspect is remarkable in that it enables a plurality of optical components associated with the same wavelength to be merged while also managing collisions. In the event of two optical components being present simultaneously on input ports of the device, no more than one of them is present at the output from the device. Collisions at the input to the merging device are managed without it being necessary to allocate a respective wavelength to each of the sources of optical components. In the merging device, only elementary operations are performed in the optical domain using components that are presently available.

The various embodiments or characteristics mentioned below may be added independently or in combination with one another to the merging device of the first aspect.

In a first particular embodiment of the device, the optical element is also arranged to amplify the optical component, and the duplication element is connected to the outputs of the optical element.

Under such circumstances, in the event of a collision at the input to the device, the optical component that was the first to be present at an input of the device is the component that is transmitted. A second optical component that becomes present subsequently on another input port of the device is blocked, and continues to be blocked so long as the first optical component is present. The operation of this first embodiment is based on the "first-come, first-served" principle.

In a second particular embodiment of the device, the optical element is also arranged to amplify the optical component, and the duplication element is connected to the inputs of the optical element.

Under such circumstances, in the event of a collision at the input to the device, then none of the optical components is present at the output from the device.

According to a particular characteristic, the merging device further comprises, for each optical component of said plurality of components for merging, a delay element arranged to apply a delay of predetermined fixed duration to said optical component for merging, the delay element being connected to the inputs of the blocking element associated with said optical component for merging.

This makes it possible to configure the optical element in the appropriate position prior to the optical component arriving.

In a third particular embodiment, in the blocking position, the optical element diverts said optical component for merging to an injection element arranged to reinject said optical component into an optical fiber going back to a source node.

Such a device thus enables a source node to be informed that a collision has occurred and that consequently data that has been sent has been eliminated as a result of the corresponding optical component being eliminated. The source node as notified in this way can send the data that has suffered a collision once again. The merging device in this third embodiment thus enables collisions to be managed, while notifying transmitting source nodes of any data losses.

It is emphasized at this point that this takes place entirely optically and thus without making use of any signaling messages, and without performing any electronic processing on the optical components.

According to a particular characteristic, a control unit forms the combination element.

The control unit serves to improve the management of blocking signals and to avoid transmitting packets that are incomplete.

The merging device of the first aspect is for integrating in an optical combiner of a second aspect.

An embodiment of the disclosure thus also provides an optical combiner of optical signals, an optical signal comprising optical components associated respectively with a plurality of wavelengths, said optical combiner comprising:

- a demultiplexer element respectively associated with an input optical signal and arranged to obtain from the input optical signal a plurality of optical components;
- a plurality of merging devices according to the first aspect, each associated with one respective wavelength and connected to the outputs of the demultiplexer element; and
- a multiplexer element arranged to multiplex the optical components output by the merging devices into an output optical signal.

The optical combiner thus makes it possible, in the time domain, to multiplex a plurality of optical signals comprising optical components into a single output optical signal, by acting at each wavelength to eliminate those packets that give rise to collisions. The optical combiner is dynamic since it does not require a wavelength to be allocated to each of the optical signal sources. This serves to improve utilization of the capacity of optical fibers.

The optical combiner is also dynamic in that it is possible to merge only some of the optical components making up the optical signal.

The optical combiner of the second aspect provides a simple and effective solution to the problem of switching packets optically. The combiner does no more than combine the optical signals: it does not perform any switching operation properly speaking. Switching is performed by means of the wavelengths: for example, each wavelength on each input port is associated with a respective output port. The switching table is thus static, but when streams from a plurality of input interfaces converge on the same output interface, they are combined in dynamic manner by an embodiment of the disclosure.

In this optical combiner, only elementary operations are performed in the optical domain using components that are presently available. This also makes it possible to implement it at packet level on a present-day volume of traffic.

Switching is performed at packet level without any need to aggregate packets. This optimizes the use of optical network resources. The optical switching of a packet is performed in a length of time that is compatible with present switching constraints, i.e. of the order of the duration of a packet, namely a duration of about one microsecond.

Furthermore, no electronic processing of the packet is required, thus making it possible to limit the energy consumption of the combiner.

The optical combiner does not need to exchange signaling traffic prior to transmitting a packet. This serves to improve the use of the capacity of optical fibers. Furthermore, the optical combiner does not require packets to be aggregated, nor does it require an optical packet to be queued.

The optical combiner of the second aspect is for integrating in an optical node for aggregating optical signals of a third aspect.

An embodiment of the disclosure thus also provides an optical node for aggregating optical signals, an optical signal comprising a plurality of optical components associated with a respective plurality of wavelengths, said node comprising:

- an optical combiner of optical signals according to the second aspect arranged to combine optical signals received from respective source optical nodes into one optical signal; and
- an optical signal distribution device arranged to distribute one received optical signal to said source nodes.

In a fourth aspect, an embodiment of the disclosure also provides a method of merging a plurality of optical components associated with one wavelength into a merged optical component associated with said wavelength, the method comprising:

- a step of duplicating optical components of said plurality of components for merging, during which step said optical components for merging are duplicated;
- a step of obtaining blocking signals, in which a blocking signal associated with an optical component for merging is obtained by combining the duplicated optical components of the plurality of components other than said optical component for merging;
- a blocking step, during which an optical component for merging is blocked as a function of the associated blocking signal; and
- a step of obtaining the merged optical component associated with the wavelength from a non-blocked optical component.

In a fifth aspect, an embodiment of the disclosure also provides a method of optically combining optical signals, an optical signal comprising optical components associated with a respective plurality of wavelengths, the method comprising:

- a step of demultiplexing the input optical signals in order to obtain a plurality of optical components from an input optical signal;
- implementing a merging method according to the fourth aspect on the optical components associated with one wavelength as obtained from input optical signals in the demultiplexing step; and
- a step of multiplexing the output optical signals obtained by implementing the method of merging into an output optical signal.

BRIEF DESCRIPTION OF THE DRAWINGS

Other characteristics and advantages appear on examining the following detailed description and the accompanying drawings, in which.

DETAILED DESCRIPTION OF ILLUSTRATIVE EMBODIMENTS

Figure 1A:
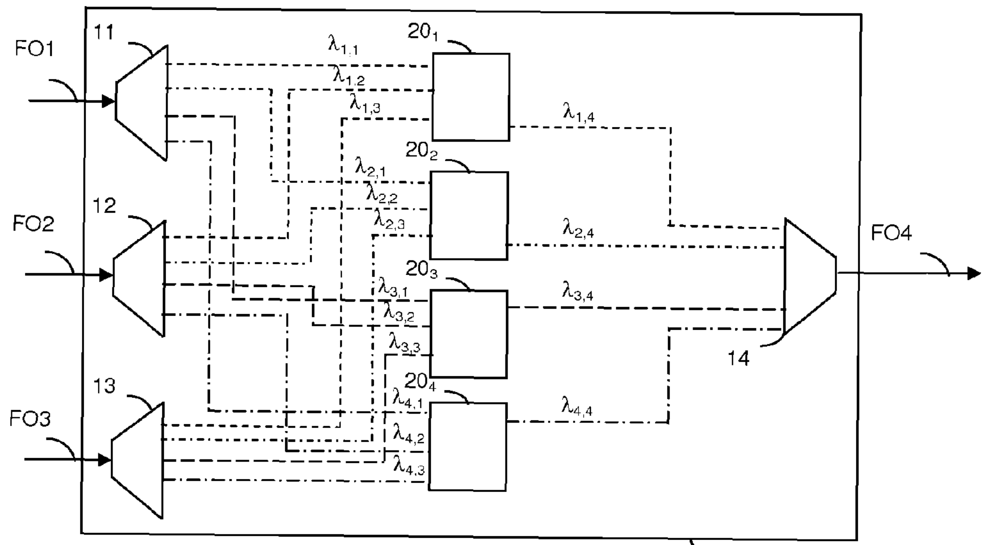
FIG. 1*a* is a diagram of an optical combiner in a particular embodiment of the disclosure.

FIG. 1*a* is a diagram of an optical combiner 110 in a particular embodiment of the disclosure. More precisely, the optical combiner 110 enables N input optical signals to be combined into one output optical signal. In the particular example of FIG. 1*a*, three optical signals are combined. This example is easily transposable to other configurations as a function of the number N of optical signals to be combined.

The first optical signal is received via a first optical fiber FO1, which fiber is connected to the optical combiner 110 via a first input port. The second optical signal is received via a second optical fiber FO2 that is connected to the optical combiner 110 via a second input port. The third optical signal is received via a third optical fiber FO3 that is connected to the optical combiner 110 via a third input port. The output optical signal from the optical combiner 110 on an output port is transmitted via a fourth optical fiber FO4.

Each of the input and output optical signals comprises a plurality W of optical components, each optical component being associated with a given wavelength. In the particular example of FIG. 1*a*, four optical components make up an optical signal. No limitation is associated with the number of optical components that make up an optical signal. Furthermore, it is possible to combine a subset of optical components that make up an optical signal. Also, the numbers N of optical signals and W of optical components may be selected independently of each other.

The first input optical signal is demultiplexed into four wavelengths $\lambda_1$, $\lambda_2$, $\lambda_3$, $\lambda_4$ by a first demultiplexer 11. The four optical components $\lambda_{1,1}$, $\lambda_{2,1}$, $\lambda_{2,1}$, $\lambda_{3,1}$, $\lambda_{4,1}$ of the first optical signal are obtained at outputs from this first demultiplexer 11. The second input optical signal is demultiplexed into four wavelengths $\lambda_1$, $\lambda_2$, $\lambda_3$' $^{\lambda}{}_4$ by a second demultiplexer 12. The four optical components $\lambda_{1,2}$, $\lambda_{2,2}$, $\lambda_{3,2}$, $\lambda_{4,2}$ of the second optical signal are obtained at outputs from the second demultiplexer 12. The third input optical signal is demultiplexed into four wavelengths $\lambda_1$, $\lambda_2$, $\lambda_3$, $\lambda_4$ by a third demultiplexer 13. The four optical components $\lambda_{1,3}$, $\lambda_{2,3}$, $\lambda_{3,3}$, $\lambda_{4,3}$ of the third optical signal are obtained at outputs from the third demultiplexer 13.

The optical components of the first, second, and third optical signals are then regrouped by wavelength $\lambda_1$, $\lambda_2$, $\lambda_3$, $\lambda_4$ and applied to inputs of merging devices 20$_1$, 20$_2$, 20$_3$, 20$_4$. The merging devices of the disclosure enable a plurality of optical components to be combined into one resultant optical component, and in such a manner that collisions between the optical components at the inputs of the merging device are avoided. No more than one of the optical components generating a collision is selected.

More precisely, the optical components $\lambda_{1,1}$, $\lambda_{1,2}$, $\lambda_{1,3}$ are applied to the inputs of the first merging device 20$_1$; the optical components $\lambda_{2,1}$, $\lambda_{2,2}$, $\lambda_{2,3}$ are applied to the inputs of the second merging device 20$_2$; the optical components $\lambda_{3,1}$, $\lambda_{3,2}$, $\lambda_{3,3}$ are applied to the inputs of the third merging device 20$_3$; and the optical components $\lambda_{4,1}$, $\lambda_{4,2}$, $\lambda_{4,3}$ are applied to the inputs of the fourth merging device 20$_4$.

A first optical component $\lambda_{1,4}$ associated with the wavelength $\lambda_1$ is obtained at the output from the first merging device 20$_1$. A second optical component $\lambda_{2,4}$ associated with the wavelength $\lambda_2$ is obtained at the output from the second merging device 20$_2$. A third optical component $\lambda_{3,4}$ associated with the third wavelength $\lambda_3$ is obtained at the output from the third merging device 20$_3$. A fourth optical component $\lambda_{4,4}$ associated with the fourth wavelength $\lambda_4$ is obtained at the output from the fourth merging device 20$_4$.

The four optical components $\lambda_{1,4}$, $\lambda_{2,4}$, $\lambda_{3,4}$, $\lambda_{4,4}$ respectively at the outputs from the respective merging devices 20$_1$, 20$_2$, 20$_3$, 20$_4$ are then injected into a multiplexer 14 in order to form the output optical signal.

Figure 1B:
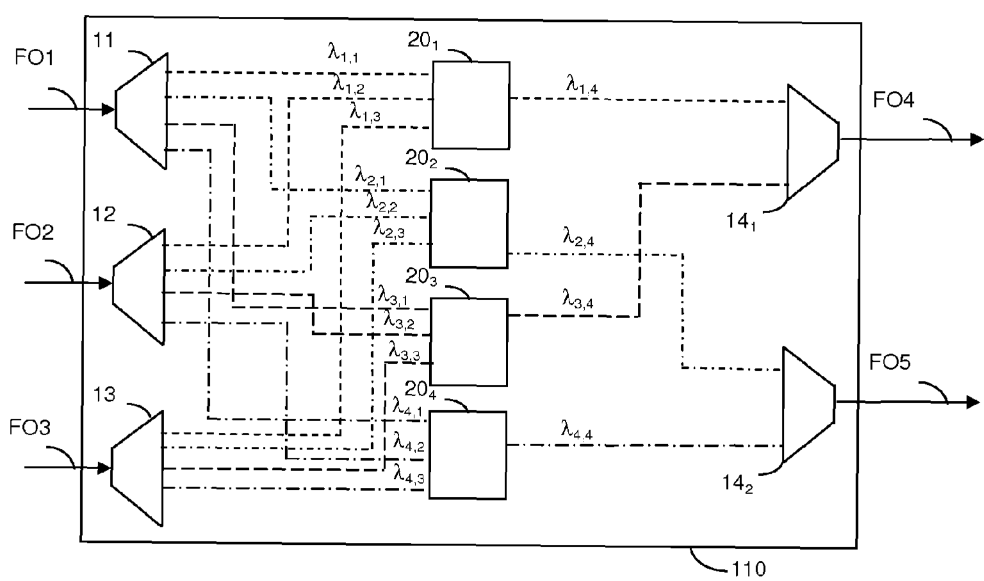
FIG. 1*b* is a diagram of an optical combiner in another particular embodiment of the disclosure.

FIG. 1*b* shows another embodiment of the optical combiner 110.

More precisely, the optical combiner 110 as shown in FIG. 1*b* serves to combine three input optical signals into two output optical signals. The output optical signals from the optical combiner 110 are transmitted via respective fourth and firth optical fiber FO4 and FO5.

The optical combiner has wavelength demultiplexers 11, 12, 13 and merging devices 20$_1$, 20$_2$, 20$_3$, 20$_4$ similar to those described above with reference to FIG. 1*a*.

Two of the fourth optical components $\lambda_{1,4}$, $\lambda_{3,4}$ at the outputs respectively from the merging devices 20$_1$, 20$_3$ are then injected into a first multiplexer 14$_1$ in order to form a first optical signal.

The other two optical components $\lambda_{2,4}$, $\lambda_{3,4}$ at the outputs respectively of the merging devices 20$_2$, 20$_4$ are then injected into a second multiplexer 14$_2$ in order to form a second output optical signal.

It is thus possible in an optical combiner to combine N optical signals present as inputs into M optical signals present as outputs. There is no limit attached on the number of input optical signals nor on the number of output optical signals.

In such an optical combiner, it is also possible to make provision for combining the optical components associated with a given wavelength and present on a first set of input ports of the combiner to go to a first output port and for combining the components present on a second set of input ports of the combiner to go to a second output port.

No limitation is associated with these examples. It is thus possible to switch any of the wavelengths on an input port to any one of the output ports.

Above, the description of an optical combiner applies to a configuration having three channels. The number of channels should be adapted as a function of the number of wavelengths to be processed. The number of input ports should be defined on the basis of the number of sources to be combined.

Figure 2:
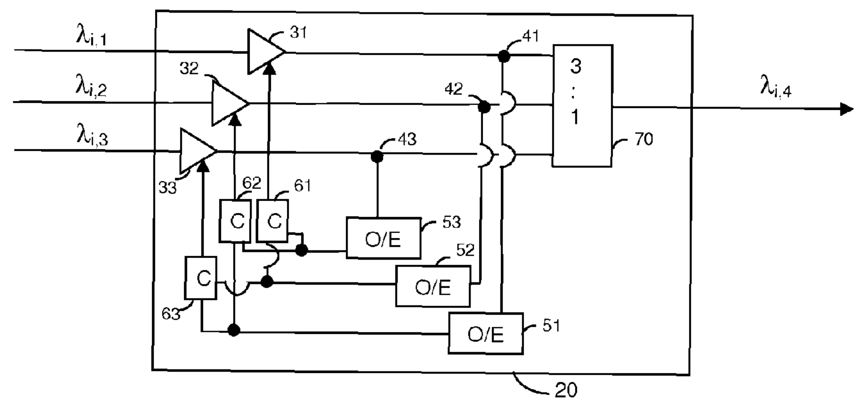
FIG. 2 is a diagram of a merging device in another particular embodiment of the disclosure.

A device 20 for merging a plurality of optical components associated with the same wavelength into one optical component associated with that wavelength is described below with reference to FIG. 2 in a particular embodiment of the disclosure.

For a first optical component $\lambda_{i,1}$ associated with the wavelength $\lambda_i$, the merging device 20 has the following elements forming a first channel:

first optical element 31 arranged to switch to a position for blocking this first optical component as a function of a first blocking signal; and first duplication element 41 connected at the output of the first optical element 31 and arranged to duplicate the first optical component on two output ports.

The first output port of the first duplication element 41 is connected to the input of a merging module 70 having three input ports and one output port. The merging module 70 is arranged to merge its input optical components so as to form an output optical component. The first duplicated optical component is thus injected into an input of the merging module 70.

The second output port of the first duplication element 41 is connected to the input of a first optoelectronic converter 51. The first duplicated optical component is thus converted into a first electrical signal.

For a second optical component $\lambda_{i,2}$ associated with the wavelength $\lambda_i$, the merging device 20 has the following elements, forming a second channel:

second optical element 32 arranged to switch to a position for blocking this second optical component as a function of a second blocking signal; and second duplication element 42 connected at the output of the second optical element 32 and arranged to duplicate the second optical component on two output ports.

The first output port of the second duplication element 42 is connected to an input of the merging module 70. The duplicated second optical component is thus injected as an input to the merging module 70.

The second output port from the second duplication element 42 is connected to the input of a second optoelectronic converter 52. The duplicated second optical component is thus converted into a second electrical signal.

For a third optical component $\lambda_{i,3}$ associated with the wavelength $\lambda_i$, the merging device 20 has the following elements, forming a third channel:

third optical element 33 arranged to switch to a position for blocking this third optical component as a function of a third blocking signal; and third duplication element 43 connected at the output of the third optical element 33 and arranged to duplicate the third optical component on two output ports.

The first output port of the third duplication element 43 is connected to an input of the merging module 70. The duplicated third optical component is thus injected as input into the merging module 70.

The second output port of the third duplication element 43 is connected to an input of a third optoelectronic converter 53. The duplicated third optical component is thus converted into a third electrical signal.

The first, second, and third optical elements 31, 32, and 33 are also designed to amplify the optical signals they receive as inputs, in the absence of a blocking signal. This is said to be the "transfer" position. By way of example this may involve a semiconductor optical amplifier SOA. No limit is associated with this type of device. It is recalled at this point that when the blocking signal is present, the optical elements 31, 32, or 33 switch into a blocking position so as to block the optical signals input into said elements.

The first, second, and third duplication elements 41, 42, and 43 may be 80-20 couplers, for example.

The second and third electrical signals coming respectively from the second and third channels are then combined by a first coupler 61 to form the first blocking signal for the first optical element 31.

The first and third electrical signals coming respectively from the first and third channels are then combined by a second coupler 62 to form the second blocking signal for the second optical element 32.

The first and second electrical signals coming respectively from the first and second channels are then combined by a third coupler 63 to form the third blocking signal for the third optical element 33.

Thus, for a given optical component, the merging device 20 has a combination element arranged to obtain a blocking signal for the optical element associated with the given optical component by combining the optical components for merging other than the given optical component.

An optical component $\lambda_{i,4}$ is obtained at the output from the merging module 70. This optical component at the output from the merging device 20 corresponds to merging the three optical components input to the merging device 20.

Thus, in this first embodiment, when a data collision occurs on input between a plurality of optical components, the data from only one optical component is present on output. When any one optical component is selected, the other optical components are blocked. Thus, the optical component that becomes active first is the component that is selected to form the output optical component. When the selected optical component becomes inactive, another optical component that has become active may be selected in turn. A single optical component is selected from among the active components input to a merging device in order to form the output optical component, on the basis of a "first-come, first-served" mechanism.

Operating states of the merging device 20 are described below in detail with reference to FIGS. 3*a*, 3*b*, and 3*c*.

Figure 3A:
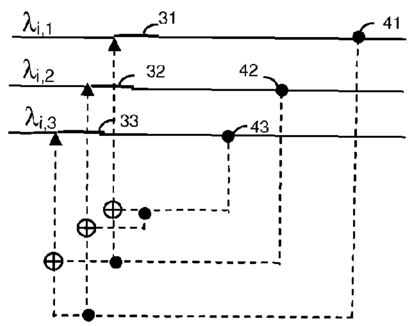
FIGS. 3*a*, 3*b*, and 3*c* show three operating states of the merging device in a particular embodiment of the disclosure.

FIG. 3*a* corresponds to a state in which no optical component is present on any of the input ports of the merging device 20.

All three of the first, second, and third optical elements 31, 32, and 33 are in their respective transfer positions.

Figure 3B:
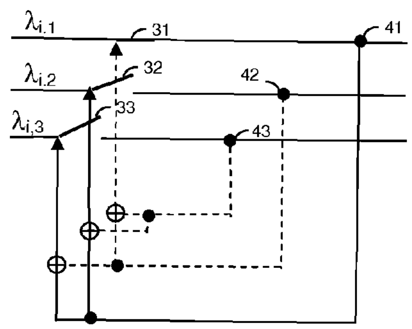

FIG. 3*b* corresponds to a state in which a first optical component $\lambda_{i,1}$ associated with the wavelength $\lambda_i$ is present on the first input of the merging device 20. The first duplication element 41 duplicates the first optical component and enable the first electrical signal to be formed, and thus enable the second and third blocking signals to be formed. The second and third blocking elements 32 and 33 then switch to their blocking positions respectively under the control of the second and third blocking signals.

The output optical component from the merging device 20 is then formed by the first optical component. When the first optical component becomes inactive, the first electrical signal is no longer present and the second and third blocking elements 32 and 33 return to their transfer position, as shown in FIG. 3*a*.

Figure 3C:
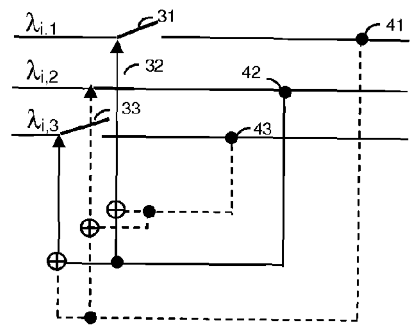

FIG. 3*c* corresponds to a state in which a second optical component $\lambda_{i,2}$ associated with the wavelength $\lambda_i$ is present on the second input of the merging device 20. The second duplication element 42 duplicates the second optical component and enable the second electrical signal to be formed, and thus enable the first and third blocking signals to be formed. The first and third blocking elements 31 and 33 then switch to their blocking positions respectively under the control of the first and third blocking signals.

The optical component output by the merging device 20 is then formed by the second optical component. When the second optical component becomes inactive, the second electrical signal is no longer present and the first and third blocking elements 31 and 33 return to the transfer position, as shown in FIG. 3*a*.

In the state shown in FIG. 3*c*, when a third optical component $\lambda_{i,3}$ associated with the wavelength $\lambda_i$ is present on the third input of the merging device 20, this third component will be blocked so long as the second component is present at the input of the device.

A residual optical signal might then be transmitted when the blocking element 33 switches to the transfer position. In order to avoid transmitting this residual optical signal, it is possible, as an option, to provide individual electronic gates serving to keep the blocking element 31, 32, 33 in the blocked position so long as a residual input optical signal is present. This enables the performance of the device to be improved by blocking the transmission of potentially incomplete packets.

In the first particular embodiment described with reference to FIGS. 2, 3*a*, 3*b*, and 3*c*, the duplication elements 41-43 are connected to the outputs of the optical elements 31-33.

This embodiment thus presents the advantage of managing data collisions input to the merging device 20 on the basis of the "first-come, first-served" principle.

In a second particular embodiment (not shown), the duplication elements 41-43 are placed at the input of the merging device 20. Under such circumstances, a data collision at the input to the merging device 20 leads to no data being output from the merging device 20. This second embodiment thus enables collisions to be managed, but it is nevertheless not as advantageous as the preceding embodiment.

In a first variant of the first embodiment of the merging device 20, the combination elements 61, 62, and 63 combine optical signals.

The second output port from the first duplication element 41 is connected to inputs of the second and third combination elements 62 and 63, after duplication.

The second output port of the second duplication element 42 is connected to the inputs of the first and third combination elements 61 and 63, after duplication. The second output port of the third duplication element 43 is connected to inputs of the first and second combination element 61 and 62, after duplication.

The optical signal output from the combination element 61 is then converted into an electrical signal by a first optoelectronic converter to form the first blocking signal.

The optical signal output from the combination element 62 is then converted into an electrical signal by a second optoelectronic converter to form the second blocking signal.

The optical signal output from the combination element 63 is then converted into an electrical signal by a third optoelectronic converter to form the third blocking signal.

The optical combination element presents the advantage of being passive and thus of not requiring an electrical power supply.

In a second variant of the first embodiment of the merging device 20, a first delay element is connected to the inputs of the first optical element 31. The first delay element is arranged to apply a delay of predetermined fixed duration D to the first optical component $\lambda_{i,1}$ input to the merging device 20. By way of example, it may be a fiber delay line of fixed length. The fixed duration is determined beforehand as a function of the time required for the optical signal to propagate and for the first optical element 31 to be configured. Similarly, a second delay element is connected to the input of the second optical element 32, and a third delay element is connected to the input of the third optical element 33. The second and third delay elements are similar to the first delay element.

Figure 7:
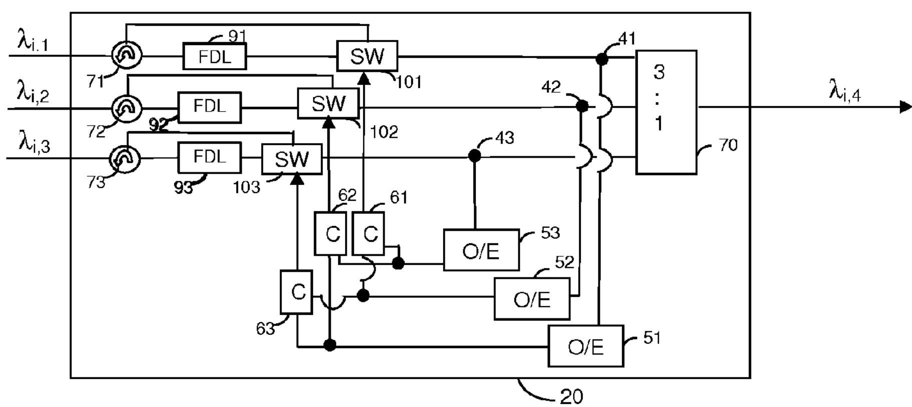
FIG. 7 is a diagram of a merging device in a particular embodiment of the disclosure.

A merging device 20 for merging a plurality of optical components associated with the same wavelength into an optical component associated with that wavelength is described below with reference to FIG. 7 in a third particular embodiment of the disclosure.

For a first optical component $\lambda_{i,1}$ associated with the wavelength $\lambda_1$, the merging device 20 comprises the following elements, forming a first channel:

- first optical element 101 arranged to switch to a state for blocking this first optical component as a function of a first blocking signal; and
- first duplication element 41 connected to a first output port of the first optical element 101 and arranged to duplicate the first optical component on two output ports.

The first output port of the first duplication element 41 is connected to a merging module 70 having three input ports and one output port. The merging module 70 is arranged to merge the optical components input thereto into an optical component output therefrom. The first duplicated optical component is thus injected as input into the merging module 70.

The second output port of the first duplication element 41 is connected as input to a first optoelectronic converter 51. The first optical component is thus converted into a first electrical signal.

An output of the first delay element 91 is connected to an input of the first optical element 101. The first delay element 91 is arranged to apply a delay of predetermined fixed duration D to the first input optical component $\lambda_{i,1}$. By way of example, this may be a fiber delay line. The fixed duration is determined beforehand as a function of the time needed for the optical signal to propagate and for the first optical element 101 to be configured.

In a first "transfer" first position, the first optical element 101 is arranged to switch the first optical component $\lambda_{i,1}$ to the first output port that is connected to the first duplication element 41. This transfer position corresponds to the position occupied in the absence of the first blocking signal.

In a second position, corresponding to the blocking position, the first optical element 101 is arranged to transmit the first optical component $\lambda_{i,1}$ to a second output port. This second output port of the first optical element 101 is connected to a first circulator 71 that reinjects the first optical component $\lambda_{i,1}$ that has suffered a collision back into the optical fiber in the direction opposite to the propagation direction. The first circulator 71 is thus placed at the first input port of the merging device 20 and is arranged to pass the first optical component in the propagation direction and to reinject a return signal in the direction opposite to the propagation direction.

To summarize, when the first blocking signal is absent, the first optical element 101 is in the transfer position for transferring the first optical component to the first output port; when the first blocking signal is present, the first optical element 101 is in the blocking position for blocking the first optical component and for diverting it to the second output port. This may be implemented, for example, as a "micro-ring resonator" type switch. No limitation is associated with this type of device.

For a second optical component $\lambda_{i,2}$ associated with the wavelength $\lambda_i$, the merging device 20 comprises the following elements, forming a second channel:

- second optical element 102 arranged to switch to a state for blocking this second optical component as a function of a second blocking signal; and second duplication element 42 connected to a first output port of the second optical element 102 and arranged to duplicate the second optical component on two output ports.

The first output port of the second duplication element 42 is connected to the second input of the merging module 70. The duplicated second optical component is thus injected as input to the merging module 70.

The second output port of the second duplication element 42 is connected to an input of a second optoelectronic converter 52. The duplicated second optical component is thus converted into a second electrical signal.

An output of second delay element 92 is connected to an input of the second optical element 102. The second delay element 92 is arranged to apply a delay of predetermined fixed duration D to the second optical component $\lambda_{i,2}$ input thereto, and they are similar to the first delay element 91.

The second optical element 102 is similar to the first optical element 101. When the second blocking signal is absent, the second optical element 102 is in a transfer position for transferring the second optical component $\lambda_{i,2}$ to the first output port that is connected to the second duplication element 42; when the second blocking signal is present, the second optical element 102 are in a blocking position for blocking the second optical component $\lambda_{i,2}$ and diverting it to a second output port. The second output port of the second optical element 102 is connected to a second circulator 72 that reinjects the second optical component $\lambda_{i,2}$ that has suffered a collision into the optical fiber. The second circulator 72 is placed at the second input port of the merging device and it is similar to the first circulator 71.

For a third optical component $\lambda_{i,3}$ associated with the wavelength $\lambda_i$, the merging device 20 comprises the following elements, forming a third channel:

third optical element 103 arranged to switch to a state for blocking this third optical component as a function of a third blocking signal; and third duplication element 43 connected to a first output port of the third optical element 103 and arranged to duplicate the third optical component on two output ports.

The first output port of the third duplication element 43 is connected to the third input of the merging module 70. The duplicated third optical component is thus injected as input into the merging module 70.

The second output port of the third duplication element 43 is connected to an input of a third optoelectronic converter 53. The third optical component is thus converted into a third electrical signal.

An output of third delay 93 is connected to an input of third optical element 103. The third delay element 93 is arranged to apply a delay of predetermined fixed duration D to the third input optical component $\lambda_{i,3}$ and they are similar to the first delay element 91.

The third optical element 103 is similar to the first optical element 101. When the third blocking signal is absent, the third optical element 103 is in a transfer position for transferring the third optical component $\lambda_{i,3}$ to the first output port that is connected to the third duplication element 43; when the third blocking signal is present, the third optical element 103 is in a blocking position for blocking the third optical component $\lambda_{i,3}$ and diverting it to a second output port. The second output port of the third optical element 103 is connected to a third circulator 73 that reinjects the third optical component $\lambda_{i,3}$ that has suffered a collision into the optical fiber. The third circulator 73 is placed at the third input port of the merging device and is similar to the first circulator 71.

By way of example, the first, second, and third duplication elements 41, 42, and 43 are 80-20 couplers.

The second and third electrical signals coming respectively from the second and third channels are then combined by a first coupler 61 to form the first blocking signal for blocking the first optical element 101.

The first and third electrical signals coming respectively from the first and third channels are then combined by a second coupler 62 to form the second blocking signal for blocking the second optical element 102. The first and second electrical signals coming respectively from the first and second channels are then combined by a third coupler 63 to form the third blocking signal for blocking the third optical element 103.

Thus, for a given optical component, the merging device 20 has a combination element arranged to obtain a blocking signal for the optical element associated with the given optical component by combining the optical components for merging other than the given optical component.

An optical component $\lambda_{i,4}$ is obtained at the output from the merging module 70. This output optical component from the merging device 20 corresponds to merging the three optical components input to the merging device 20.

As an illustration, examples similar to those described with reference to FIGS. 3*a*, 3*b*, and 3*c* are described below.

In a first state, no input optical component is present at the input of the merging device 20.

The first, second, and third optical elements 101, 102, and 103 are in their respective transfer positions.

In a second state, a first optical component $\lambda_{i,1}$ associated with the wavelength $\lambda_i$ is present at the first input of the merging device 20. The first duplication element 41 duplicates the first optical component and enable the second and third blocking signals to be formed. The second and third optical elements 102 and 103 then switch to their blocking positions respectively under the control of the second and third blocking signals. When a second optical component is present at an input of the device, it is then reinjected into the optical fiber via the second circulator 72 back to the corresponding source node so long as the first component is present at an input of the device. When a third optical component is present at an input of the device, it is reinjected into the optical fiber via the third circulator 73 to the corresponding source node so long as the first component is present at an input of the device. The output optical component from the merging device 20 is then constituted by the first optical component. When the first optical component becomes inactive, the second and third blocking signals are no longer present and the second and third optical elements 102 and 103 return to the transfer position, corresponding to the first state as described above.

In a third state, a second optical component $\lambda_{i,2}$ associated with the wavelength $\lambda_i$ is present at the second input of the merging device 20. The second duplication element 42 duplicates the second optical component and enable the first and third blocking signals to be formed. The first and third optical elements 101 and 103 then switch to their blocking positions under the control respectively of the first and third blocking signals. When a first optical component $\lambda_{i,1}$ associated with the wavelength $\lambda_i$ is present at an input of the merging device 20, this first component is blocked and reinjected into the optical fiber via the first circulator 71 back towards the corresponding source node so long as the second component is present at an input of the device. When a third optical component $\lambda_{i,3}$ associated with the third wavelength $\lambda_i$ is present at the third input of the merging device 20, the third component is blocked and reinjected into the optical fiber via the third circulator 73 back towards the corresponding source node so long as the second component is present at an input of the device. The optical component output by the merging device 20 is then formed by the second optical component. When the second optical component becomes inactive, the first and third blocking signals are no longer present and the first and third optical elements 101 and 103 return to the transfer position, corresponding to the first state described above.

Thus, in this third embodiment, in a manner similar to the first embodiment, when a data collision occurs between a plurality of input optical components, the data from only one optical component is present at the output. When one optical component is selected, the other optical components are blocked and are returned by the merging device 20 back towards the source nodes that sent them. Thus, the optical component that is the first to become active is selected to form the output optical component. When the selected optical component becomes inactive, another optical component that has become active can be selected in turn. Only one optical component is selected from among the active components being input to a merging device in order to form the output optical component, on the basis of a "first-come, first-served" mechanism.

The first variant described with reference to the first embodiment also applies to the third embodiment.

In a third variant of these embodiments, individual electronic gates are provided so as to keep the blocking elements 31-33, 101-103 in the blocking position so long as a blocked optical component is present at an input of the merging device 20. If the blocking elements 31-33, 101-103 switch to the transfer position as soon as the selected optical component is no longer present, then a residual signal associated with a blocked optical component might still be present at an input of the merging device. The individual electronic gates thus serve to avoid transmitting such a residual signal, corresponding to an incomplete packet.

In a fourth variant of these embodiments, a control unit is arranged to form the blocking signals, as a replacement for the combination elements 61-63.

The control unit is arranged to form and transmit:

- the second and third blocking signals respectively to the second and third optical elements in the presence of the first electrical signal;
- the first and third blocking signals respectively to the first and third optical elements in the presence of the second electrical signal; and
- the first and second blocking signals respectively to the first and second optical elements in the presence of the third electrical signal.

The transmitted blocking signals are maintained for a predetermined duration, equal to the duration of a packet, so long as a residual signal corresponding to a blocked optical component is present at an input of the merging device. Thus, the optical elements associated with the blocked optical components remain in the blocking position so long as a residual signal is present at an input. Consequently, only complete packets are present at the output from the merging device 20. This variant also serves to combine some larger number of optical components.

Furthermore, this also makes it possible to improve the performance of the merging device for the second embodiment by avoiding any absence of output data in the event of a collision at the inputs of the merging device.

Figure 4:
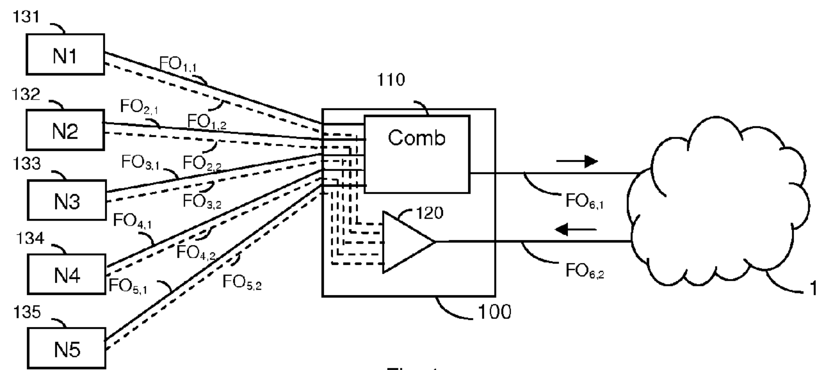
FIG. 4 shows an optical aggregation node in its environment in a particular embodiment of the disclosure.

With reference to FIG. 4, there follows a description of an optical aggregation node 100 for aggregating optical signals. Such an aggregation node serves to aggregate the optical signals received from the optical nodes 131-135 into an optical signal and to transmit this optical signal in all-optical manner to a destination of a communications network 1, e.g. the Internet, and also to distribute an optical signal received from the communications network 1 to the optical nodes 131-135. These optical nodes may belong for example to a local area network (LAN). An optical signal is transmitted by the first optical node 131 to the aggregation node 100 via a first optical fiber $FO_{1,1}$. An optical signal is transmitted from the aggregation node 100 to the first optical node 131 via a second optical fiber $FO_{1,2}$. Similarly, the second optical node 132 is connected to the aggregation node 100 via two optical fibers $FO_{2,1}$, $FO_{2,2}$; the third node 133 is connected by two optical fibers $FO_{3,1}$, $FO_{3,2}$; the fourth node 134 is connected by two optical fibers $FO_{4,1}$, $FO_{4,2}$; and the fifth node 135 is connected by two optical fibers $FO_{5,1}$, $FO_{5,2}$. An optical signal is transmitted by the aggregation node 100 to the communications network 1 via a first optical fiber $FO_{6,1}$. An optical signal is transmitted by the communications network 1 to the aggregation node 100 via a second optical fiber $FO_{6,2}$.

The aggregation node 100 comprises an optical combiner 110 of optical signals as described above and arranged to combine respective optical signals received from the optical nodes 131-135 into a single optical signal, and a distribution device 120 for distributing an optical signal and arranged to distribute one received optical signal to the optical nodes 131-135. In particular in this configuration, the optical combiner 110 comprises four input ports for optical signals.

It is emphasized at this point that data giving rise to collisions is eliminated by the merging device, as described above.

In the first and second embodiments described with reference to FIG. 2, this data that has been eliminated may be sent once again by the source node after a time delay has expired. It is also possible to provide for the aggregation node to notify the source node that sent the data that has been eliminated by an explicit signaling message.

In the third embodiment described with reference to FIG. 7, the source node receives the returned optical signal that has not been transmitted as a result of a collision. It can then send the data once again. There is therefore no need to wait for a time delay to expire, nor even to implement specific signaling to notify the source node that data has been eliminated. On receiving the return optical signal, the source node can send the eliminated data once again.

Such a source node, arranged to co-operate with the merging device of the third embodiment, comprises in particular:

- an adjustable emitter;
- an optical circulator; and
- a photodiode.

The optical circulator transmits the optical signal emitted by the adjustable emitter to its destination and enables the return optical signal received from the optical fiber to be diverted to the photodiode.

The photodiode enables a return optical signal received from a merging device 20 to be converted into an electrical signal. The electrical signal thus serves to notify the source node that a collision has occurred. It is emphasized at this point that the source node has no need to process the data conveyed by the return optical signal.

When the propagation time between the source node and the first equipment including a merging device is shorter than the duration of a packet, then in the event of a collision occurring, the source node need only retransmit the packet that is being transmitted. Such retransmission may be immediate or it may take place after a predetermined duration has expired. Otherwise, i.e. when the propagation time between the source node and the first equipment including a merging device is longer than the duration of a packet, the source node then determines as a function of the propagation time which packet has suffered a collision. The propagation time may be determined beforehand using methods that are known in the state of the art.

In order to enable the optical nodes 131-135 to communicate with one another, particular wavelengths are dedicated to local traffic. Under such circumstances, a first optical combiner 110 may be in charge of merging the wavelengths associated with traffic for the communications network 1, and a second optical combiner may be in charge of merging the wavelengths that are allocated to local traffic. It is also possible to envisage making provision for a single optical combiner, such as that described with reference to FIG. 1*b*.

The distribution device 120 is then arranged:

to merge the output optical signal from the second optical combiner with the optical signal coming from the communications network 1; and to distribute the optical signal that results from the merging.

In a more general context of interconnecting a plurality of optical access networks having a plurality of aggregation levels, a set of wavelengths may be allocated to each optical access network. The data traffic is then combined, routed, and broadcast in each aggregation node as a function of the allocated set of wavelengths.

Figure 5:
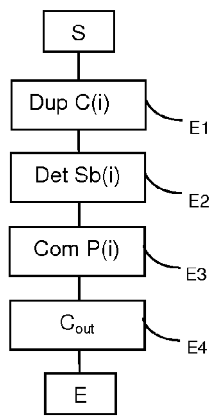
FIG. 5 shows the steps of a method of merging a plurality of optical components in a particular implementation of the disclosure.

Reference is made below to FIG. 5 which shows the steps of a method of merging a plurality of optical components associated with one wavelength into a merged optical component associated with that wavelength, these steps advantageously being performed by the merging device 20 of FIG. 2.

The merging method comprises a step E1 of duplicating the optical components for merging, during which step said optical components for merging are duplicated.

In a step E2 of the merging method, blocking signals are obtained. A blocking signal is associated with an optical component for merging and is for controlling optical elements 31, 32, 33 such as those described above. A blocking signal associated with an optical component for merging is obtained by combining the duplicated optical components of the plurality other than said optical component for merging.

Thereafter, in a step E3, the optical component for merging is blocked or is not blocked as a function of the resulting associated blocking signal.

The merged optical component associated with the wavelength is then obtained in a step E4 from the non-blocked optical component.

In a particular implementation, in step E3, the blocked optical component for merging is also a return optical component whenever the blocking signal is present.

Figure 6:
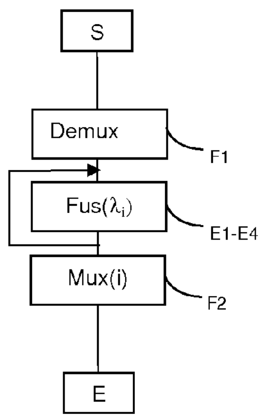
FIG. 6 shows the steps of a method of optically combining optical signals in a particular implementation of the disclosure.

Reference is made below to FIG. 6 which shows the steps of a method of optically combining optical signals, an optical signal having optical components respectively associated with a plurality of wavelengths, these steps advantageously being performed by the optical combiner 110 of FIG. 1*a*.

The optical combining method comprises a step F1 of demultiplexing input optical signals in order to obtain a plurality of optical components from an input optical signal.

The merging step as described above is then implemented for the optical component associated with one of the wavelengths obtained during the demultiplexing step from the input optical signals. Each of the wavelengths is processed in this way.

The optical combining method then comprises a step F2 of multiplexing the output optical components that have been obtained by implementing the method of merging into an output optical signal.

What is claimed is:

1. A merging device for merging a plurality of optical components associated with one wavelength into an optical component associated with said wavelength, the merging device comprising, for each optical component for merging of said plurality of optical components:

an optical element arranged to switch to a blocking position for blocking said optical component for merging, as a function of a blocking signal;

a duplication element arranged to receive the output of the optical element and to duplicate said optical component for merging; and a combination element, arranged to obtain said blocking signal by combining the duplicated optical components of the plurality of optical components other than said optical component for merging of said plurality of optical components;

wherein the merging device further comprises a merging element arranged to merge the optical components output by the optical elements.

2. The merging device according to claim 1, wherein the optical element is also arranged to amplify the optical component, and the duplication element is connected to the outputs of the optical element.

3. The merging device according to claim 1, wherein the optical element is also arranged to amplify the optical component, and the duplication element is connected to the inputs of the optical element.

4. The merging device according to claim 1, further including, for each optical component of said plurality of components for merging, a delay element arranged to apply a delay of predetermined fixed duration to said optical component for merging, the delay element being connected to the inputs of the blocking element associated with said optical component for merging.

5. The merging device according to claim 1, wherein in the blocking position, the optical element diverts said optical component for merging to an injection element arranged to reinject said optical component into an optical fiber going back to a source node.

6. The merging device according to claim 1, wherein a control unit forms the combination element.

7. The merging device according to claim 4, wherein a control unit forms the combination element.

8. The merging device according to claim 5, wherein a control unit forms the combination element.

9. An optical combiner of optical signals, an optical signal comprising optical components associated respectively with a plurality of wavelengths, said optical combiner comprising:

a demultiplexer element respectively associated with an input optical signal and arranged to obtain from the input optical signal a plurality of optical components;

a plurality of merging devices, each associated with one respective wavelength and connected to the outputs of the demultiplexer element, each merging device being configured to merge the plurality of optical components associated with the one respective wavelength into an optical component associated with said wavelength, and each merging device comprising, for each optical component for merging of said plurality of optical components:

an optical element arranged to switch to a blocking position for blocking said optical component for merging, as a function of a blocking signal;

a duplication element arranged to receive the output of the optical element and to duplicate said optical component for; and a combination element, arranged to obtain said blocking signal by combining the duplicated optical components of the plurality of optical components other than said optical component for merging of said plurality of optical components;

wherein the merging device further comprises a merging element arranged to merge the optical components output by the optical element; and a multiplexer element arranged to multiplex the optical components output by the merging devices into an output optical signal.

10. An optical node for aggregating optical signals, an optical signal comprising a plurality of optical components associated with a respective plurality of wavelengths, said node comprising:

an optical combiner of optical signals arranged to combine optical signals received from respective source optical nodes into one optical signal, the optical combiner comprising a merging device for merging the plurality of optical components associated with one wavelength into an optical component associated with said wavelength, the merging device comprising, for each optical component for merging of said plurality of optical components:

an optical element arranged to switch to a blocking position for blocking said optical component for merging, as a function of a blocking signal, wherein in the blocking position, the optical element diverts said optical component for merging to an injection element arranged to reinject said optical component into an optical fiber going back to the respective source optical node;

a duplication element arranged to receive the output of the optical element and to duplicate said optical component for merging; and a combination element, formed by a control unit, arranged to obtain said blocking signal by combining the duplicated optical components of the plurality of optical components other than said optical component for merging of said plurality of optical components;

wherein the merging device further comprises a merging element arranged to merge the optical components output by the optical element; and an optical signal distribution device arranged to distribute one received optical signal to said source optical nodes.

11. A method for merging a plurality of optical components associated with one wavelength into a merged optical component associated with said wavelength, the method comprising:

duplicating optical components of said plurality of components for merging, during which step-said optical components for merging are duplicated;

obtaining blocking signals, in which a blocking signal associated with an optical component for merging is obtained by combining the duplicated optical components of the plurality of optical components other than said optical component for merging of said plurality of optical components;

blocking an optical component for merging as a function of the associated blocking signal; and obtaining the merged optical component associated with the wavelength from a non-blocked optical component.

12. A method of optically combining optical signals, an optical signal comprising optical components associated with a respective plurality of wavelengths, the method comprising:

demultiplexing the input optical signals in order to obtain a plurality of optical components from an input optical signal;

implementing a method for merging a plurality of optical components associated with one wavelength, as obtained from input optical signals in the demultiplexing, into a merged optical component associated with said wavelength, the method comprising:

duplicating optical components of said plurality of components for merging, during which said optical components for merging are duplicated;

obtaining blocking signals, in which a blocking signal associated with an optical component for merging is obtained by combining the duplicated optical components of the plurality of optical components other than said optical component for merging of said plurality of optical components;

blocking an optical component for merging as a function of the associated blocking signal; and obtaining the merged optical component associated with the wavelength from a non-blocked optical component; and multiplexing the output optical signals obtained by implementing the method for merging into an output optical signal.

* * * * *